United States Patent [19]

Ohgushi et al.

[11] Patent Number: 4,669,275
[45] Date of Patent: Jun. 2, 1987

[54] SOFT ICE CREAM MAKER

[75] Inventors: Kikuo Ohgushi, Kanagawa; You Yoshikawa, Tokyo; Isao Ohnishi, Tokyo; Haruo Matsuura, Tokyo, all of Japan

[73] Assignee: Toki Hanbai Co., Ltd., Yokohama, Japan

[21] Appl. No.: 849,659

[22] Filed: Apr. 9, 1986

[30] Foreign Application Priority Data

Jul. 2, 1985 [JP] Japan ............................ 60-101010[U]
Jan. 28, 1986 [JP] Japan ............................ 61-10616[U]

[51] Int. Cl.⁴ ............................................. A23G 9/12
[52] U.S. Cl. ...................................... 62/342; 222/229; 222/387; 264/323; 366/189; 366/195; 425/376 R
[58] Field of Search .................. 62/342, 343; 366/189, 366/195; 15/104.04; 264/323; 425/376 R; 222/229, 235, 386, 387

[56] References Cited

U.S. PATENT DOCUMENTS

| | | | |
|---|---|---|---|
| 663,137 | 12/1900 | Turner | 62/342 |
| 1,679,205 | 7/1928 | Conill | 62/342 X |
| 2,809,498 | 10/1957 | Allen | 62/342 |
| 3,780,536 | 12/1973 | Fishman et al. | 62/342 |
| 3,803,870 | 4/1974 | Conz | 62/342 |
| 3,914,956 | 10/1975 | Knight, Jr. | 62/342 |
| 4,179,904 | 12/1979 | McClenny | 62/342 |
| 4,488,817 | 12/1984 | Vesaka et al. | 62/342 X |

FOREIGN PATENT DOCUMENTS 421327 12/1934 United Kingdom .................. 62/342

Primary Examiner—William E. Tapolcai
Attorney, Agent, or Firm—Jordan and Hamburg

[57] ABSTRACT

A handy soft ice cream maker suitable for home use. The soft ice cream maker has a housing which has a churning chamber in the center thereof and a coolant storage chamber which is hermetically sealed and filled with a coolant in the outer circumferential part thereof, a stand with holders for holding the housing in an inclined state, a churning and pressing-out mechanism removably inserted into said churning chamber from the top opening of said housing and a soft ice cream discharging exit, capable of being opened and closed, which is located at the bottom of said housing.

8 Claims, 17 Drawing Figures

FIG.6(A)
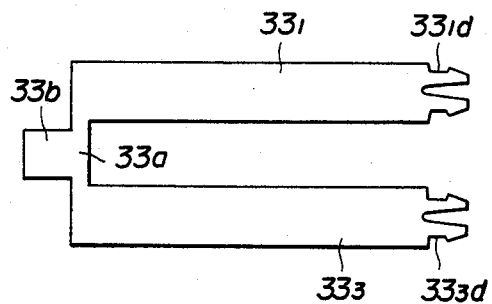
FIG.7
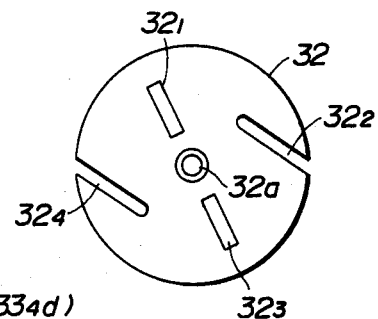
FIG.6(B)
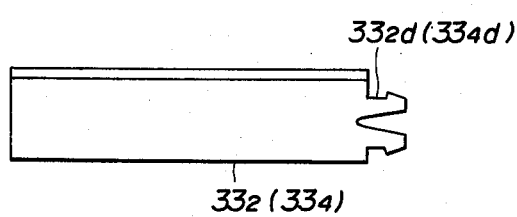
FIG.8(A)
FIG.8(B)
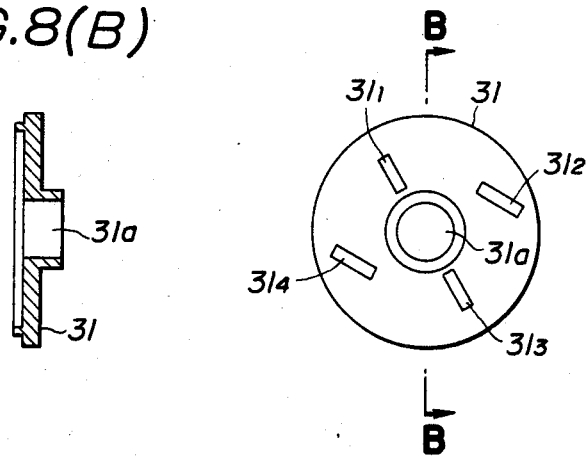

SOFT ICE CREAM MAKER

BACKGROUND OF THE INVENTION

The present invention relates to a handy soft ice cream maker suitable for home use.

In recent years, there have been available on the market ice cream makers suitable for home use but handy 'soft' ice cream makers have not been available. In the past there were several problems connected with such a device: First, it required a considerable amount of coolant which in turn needed much time to cool down. Secondly, much space was needed in a refrigerated area for cooling and storage. Thirdly, many receptacles, such as cups, and many utensils, such as spoons, were needed to serve the ice cream. The above conditions made the making and serving of ice cream complicated and costly.

SUMMARY OF THE INVENTION

It is an object of the present invention to offer a soft ice cream maker suitable for home use.

It is another object of the present invention to offer a soft ice cream maker for home use that is easy to operate.

It is still another object of the present invention to offer a soft ice cream maker which serves the soft ice cream directly into cones.

BRIEF DESCRIPTION OF THE DRAWINGS

FIGS. 6(A) and 6(B) are views for explaining the churning wings shown in FIGS. 1 and 2;

FIG. 7 is a plan view of a pressure disc shown in FIGS. 1 and 2;

FIG. 8(A) is a plan view of a rotating disc shown in FIGS. 1 and 2;

FIG. 8(B) is a cross-sectional view as seen along the line B—B of FIG. 8(A);

DESCRIPTION OF THE PREFERRED EMBODIMENT

Figure 1:
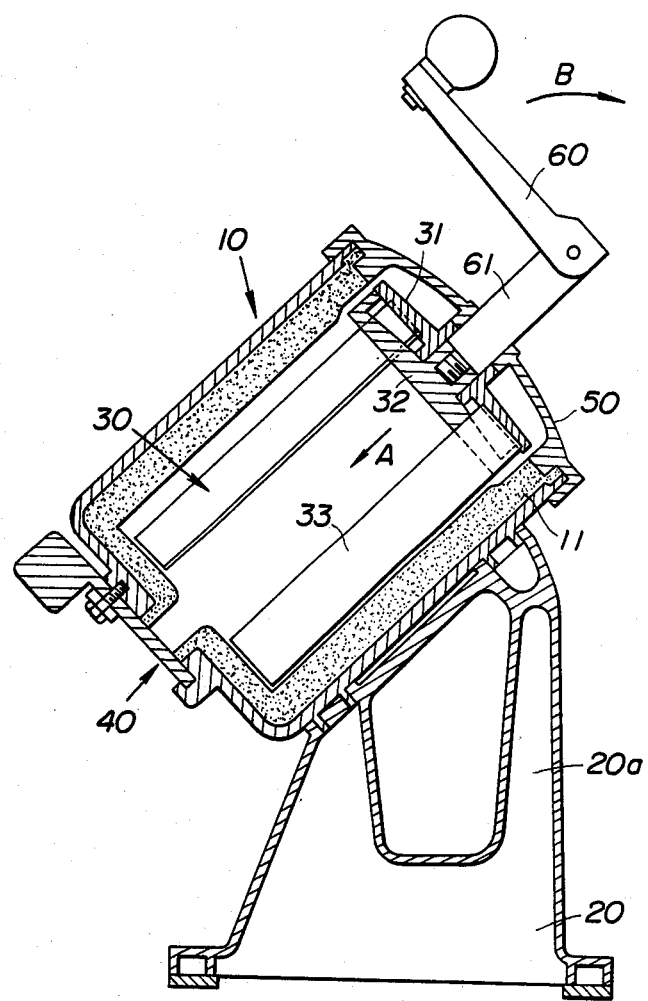
FIG. 1 is a cross-sectional side view for explaining an embodiment of a soft ice cream maker according to the present invention.

FIG. 1 is a cross-sectional side view for explaining an embodiment of the soft ice cream maker manufactured in accordance with the present invention. In FIG. 1, 10 is a housing in which soft ice cream ingredients are cooled and churned; 20 is a stand with holders for holding the housing 10 in an inclined state in such a manner that the housing 10 can be mounted and removed from the stand 20; 20a is a holder formed on the stand; 30 is a churning and pressing-out mechanism for churning to mix up the soft ice cream ingredients put into the housing 10 and for pressing out the same therefrom; 40 is a valve mechanism capable of being opened and closed as it is installed at the bottom of the housing 10, and 50 is a lid member capable of being mounted on and removed from the housing 10 and is installed at the top thereof. The lid member 50 and the churning and pressing-out parts 30 are made in one unit and the same can be inserted into the removed from the housing 10. Thus, the housing 10 is removable from the stand 20, and the churning and pressing-out parts 30 are removable from the housing 10.

Before making soft ice cream, only the housing 10 is put in a freezer space of a refrigerator together with the valve mechanism 40 in order to cool the coolant enclosed in the coolant storage chamber 11 which is formed in the outer circumferential portion of the housing 10.

To make soft ice cream, the housing 10, cooled as mentioned above, is attached to the stand 20 and the soft ice cream ingredients, i.e. a pre-mixed powder, water and milk or juice are poured into the device from the upper opening thereof after the valve mechanism 40, situated at the bottom position of the device, is closed. Next, the lid 50 is mounted on the upper opening portion of the housing 10. A handle 60, attached to the lid 50, is rotated. When the handle 60 is rotated manually, the axle 61 is also rotated thereby. A rotating disc 31 is tightly fixed on the rotating axle 61 so as to move slidably inside of the housing 10. A pressure disc 32 is unitarily attached to the tip end portion of the rotating axle 61. A plurality of churning wings 33, elongated along the axis of the rotating axle, are unitarily mounted onto the rotating disc 31. The aforementioned presser disc 32 is provided with slits through which the churning wings 33 are inserted.

In such a construction, when the handle 60 is rotated as shown in FIG. 1, the rotating axle 61 is also rotated and thereby the presser disc 32 is also rotated together with the rotating axle 61. Furthermore the churning wings 33 and the rotating disc 31 are rotated, as well and the soft ice cream ingredients put into the housing 10, as mentioned before, are churned therein by the churning wings 33 and cooled at the same time by means of the coolant as described before. In such a manner, after churning and cooling the soft ice cream ingredients during a predetermined period of time, a receptacle for receiving the soft ice cream, for instance, a cone is put under the bottom opening portion (exit) of the housing 10. When the valve mechanism 40 is opened, the rotating axle 61 is pressed down into the housing 10 at the same time in the direction shown by an arrow A. At this time, the presser disc 32 also moves in the direction of A, and the soft ice cream produced in the housing 10 is pressed out from the bottom opening portion of the housing 10 and served into the cone.

Moreover, in order to move the presser disc 32 in the direction of A as mentioned above, the handle 60 is rotated in the direction as shown by arrow B in order to put it in a state of being coaxial with the rotating axle 61 so that the strokes of the presser disc 32 become larger.

Furthermore, according to the present invention, the housing 10 is employed in a state of being inclined as mentioned above. As a result, the soft ice cream produced therein can be easily taken out and pressed out by use of the presser disc 32. However, the practical construction of the rotating wings and the presser disc is not limited to the embodiment shown in FIG. 1. It would also be possible to provide various modifications while performing an operation similar to that of the device as shown in FIG. 1.

As is apparent from the foregoing description, according to the present invention, the soft ice cream ingredients, i.e. a pre-mixed powder water and milk or juice are poured into the device from the upper opening thereof. Next, the lid member 50 is installed thereon and the handle 60 is rotated. After a predetermined period of time, when the valve mechanism 40 is opened and the presser disc 32 is pressed down in the direction of A, the soft ice cream produced in the device is discharged from the lower opening thereof. In such a construction, the soft ice cream can be served into a cone simply by putting the cone cup under the discharging outlet (lower opening). Therefore, it is very easy to use the device according to this invention. Furthermore, since the soft ice cream can be served directly into a cone, it is not necessary to have on hand a large number of receptacles nor to wash them afterwards. These are the merits of the device according to the present invention.

Figure 2:
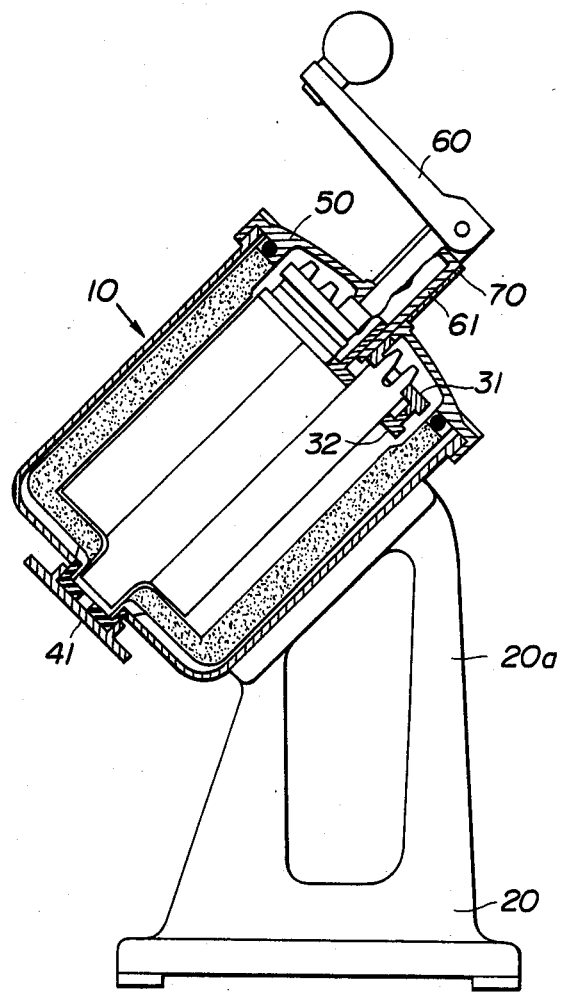
FIG. 2 is a cross-sectional side view for explaining another embodiment of the present invention.

FIG. 2 is a cross-sectional side view for explaining another embodiment of the soft ice cream maker manufactured in accordance with the present invention. The reference numerals used for the parts in FIG. 2 correspond to those in FIG. 1 since their operations are similar. The differences in structure between the soft ice cream maker shown in FIG. 1 and that shown in FIG. 2 are as follows:

In FIG. 1, the coolant storage chamber 11 and the housing 10 are formed unitarily as one unit. However, in FIG. 2, the coolant storage chamber 11 and the housing 10 are formed separately and then combined into one unit. The former 11 is removable from the latter 10.

Furthermore, in FIG. 1, the soft ice cream is pushed out from the exit by opening the valve mechanism 40 which is unitarily attached to the housing 10 as one unit, while, in FIG. 2, the soft ice cream is pushed out therefrom by detaching from the housing 10 an exit cap 41 which is attached to the exit for closing it.

Furthermore, in the case of the soft ice cream maker shown in FIG. 1, the housing 10 and the stand 20 are detachable while that shown in FIG. 2 is unitarily formed. Therefore the coolant storage chamber 11 is taken out from the housing 10, and only the coolant storage chamber 11 is put into the freezer compartment of a refrigerator in order to cool the coolant which is enclosed in the coolant storage chamber 11. The coolant storage chamber 11, cooled in such a manner, is put back into the housing 10 for the purpose of making soft ice cream.

Figure 3B:
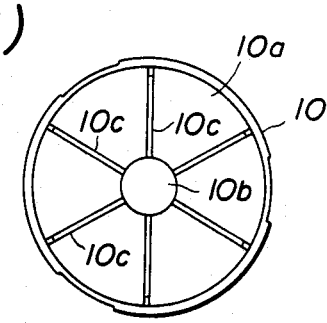
FIG. 3(B) is a top surface view as seen along the line B—B of FIG. 3(A)
Figure 3A:
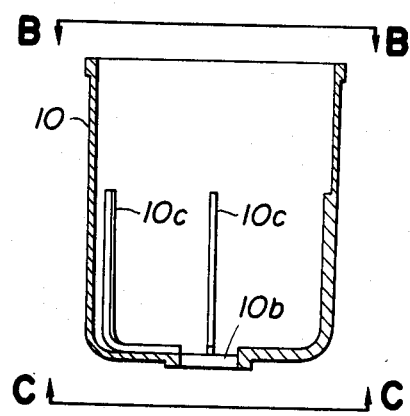
FIG. 3(A) is a cross-sectional view of a housing portion of the soft ice cream maker shown in FIG. 2.
Figure 3C:
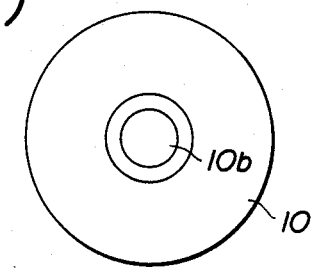
FIG. 3(C) is a bottom surface view as seen along the line C—C of FIG. 3(A).

FIGS. 3(A) through (C) show the housing 10 from which the coolant storage chamber 11, the rotating disc 31, the presser disc 32, the churning wings 33, the cap 41 and the lid member 50 are removed. FIG. 3(A) is a cross-sectional view of the housing portion 10. FIG. 3(B) is a top surface view as seen along the line B—B of FIG. 3(A). FIG. 3(C) is a bottom surface view as seen along the line C—C of FIG. 3(A).

The housing 10 has an opening 10a at one side thereof, and an exit 10b to be used for serving the soft ice cream therefrom. At the bottom of the inside of the housing 10, there are mounted a plurality of projecting ribs 10c radiating from the center line of the housing 10 for the purpose of preventing the radiation of heat thereby causing less contact of the coolant storage chamber 11 with the housing 10 when the former 11 is put in the latter 10, thus preventing the coolant storage chamber 11 from rotating, and making it easy to insert the coolant storage chamber 11 into the housing 10 and for removal as well.

Figure 4A:
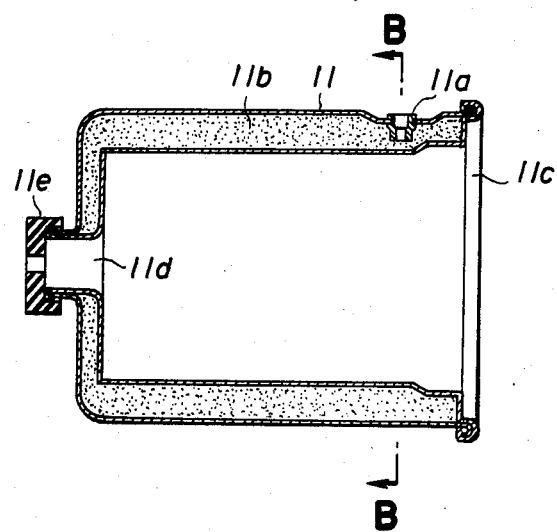
FIG. 4(A) is a cross-sectional view of the coolant storage chamber shown in FIG. 2.
Figure 4B:
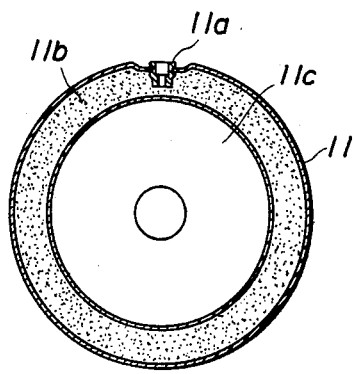
FIG. 4(B) is a cross-sectional view as seen along the line B—B of FIG. 4(A)

FIG. 4(A) is a cross-sectional side view of the coolant storage chamber to be housed in the above-mentioned housing 10. FIG. 4(B) is a cross-sectional view as seen along the line B—B of FIG. 4(A).

The housing 10 has an opening 11c at one side thereof, and an exit 11d to be used to serve the soft ice cream at the other side thereof. The coolant 11b is enclosed from a mouth 11a into the coolant storage chamber 11. After enclosing the coolant, the chamber 11 is hermetically sealed. As mentioned before, the cooler storage 11 is put into the freezer compartment of the refrigerator before starting to make the soft ice cream. The coolant storage chamber is housed in the housing 10 after completely freezing the coolant which had been put in the coolant storage chamber.

Figure 5:
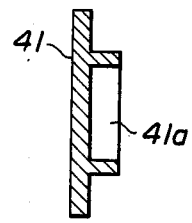
FIG. 5 is a cross-sectional view of a cap to be attached to the exit for discharging soft ice cream as shown in FIG. 2.

FIG. 5 is a cross-sectional view of the cap 41 shown in FIG. 2. The cap 41 has a fitting part 41a which is made to fit onto an elastic ring 11e around the exit 11d for discharging the soft ice cream in the coolant storage chamber 11 shown in FIG. 4. As shown in FIG. 2, while making the soft ice cream. The part 41a is fitted onto the elastic ring 11e around the exit 11d of the coolant storage chamber 11 in order to prevent leakage of the soft ice cream from the exit 11d. When the soft ice cream produced is discharged, the cap 41 is removed to open the exit 11d.

FIGS. 6(A) and (B) are detailed drawings of the churning wings 33 which are made of 4 panels, $33_1$ through $33_4$, of which 2 panels $33_2$ and $33_4$ touch the inside wall of the coolant storage chamber 11. The tips of the wings $33_1$ and $33_3$ are unitarily bridged. The bridged part 33a has a part 33b projecting outwardly to fit through the exit 11d of the coolant storage chamber 11 for discharging the soft ice cream, so that it revolves within the exit. The tips $33_1d$ through $33_4d$ of the churning wings 33 are fixed to the rotating disc 31.

FIG. 7 is a plan view of the presser disc 32 which has slits $32_1$ through $32_4$ to insert the churning wings $33_1$ through $33_4$. The above-mentioned churning wings $33_1$ through $33_4$ are fixed to a rotating disc 31 through the slits $32_1$ through $32_4$ as mentioned before. In the center 32a of the presser disc 32, the tip of the rotating axle 61 is fixed thereto. Thus, by turning the handle 60 a presser disc 32, which is fixed to the rotating axle 61, is revolved and the presser disc 32, revolves the churning wings $33_1$ through $33_4$ which in turn revolve the churning wings 33 and the rotating disc 31.

FIG. 8(A) is a plan view of the rotating disc 31.

FIG. 8(B) is a cross-sectional side view of the same. The rotating disc 31 has the slits $31_1$ through $31_4$, in which the tips $33_1d$ through $33_4d$ of the churning wings $33_1$ through $33_4$ are fixed. These are fixed on the slit $31_1$, the tip $33_1d$ of the churning wings $33_1$; on the slit $31_3$, the tip 33₃d of the churning wings 33₁; on the slit 31₂, the tip 33₂d of the churning wings 33₂; and, on the slit 31₄, the tip 33₄d of the churning wings 33₄. In the center of the rotating disc 31, there is a hole 31a, in which are inserted the rotating axle 61 and the handle 60.

Figure 9B:
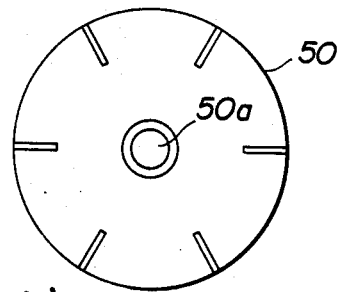
FIG. 9(B) is a plan view as seen along the line B—B of FIG. 9(A)
Figure 9A:
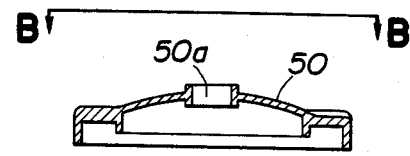
FIG. 9(A) is a cross-sectional side view of a lid shown in FIGS. 1 and 2.

FIGS. 9(A) and (B) show the lid member 50. FIG. 9(A) is a cross them oss-sectional view of the lid member and FIG. 9 (B) is a plan view as seen along the line B—B of FIG. 9(A). In the center of the lid member 50, there is a hole 50a to insert therein the handle 60 and the rotating axle 61. The perimeter thereof is so made as to fit onto the rim (opening end side) 10a of the housing 10.

Figure 10B:
FIG. 10(B) is a view as seen along the line B—B of FIG. 10(A).
Figure 10A:
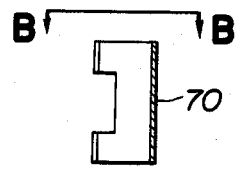
FIG. 10(A) is a cross-sectional view of a stopper for preventing a presser disc from moving downward while operating the churning wings.

FIGS. 10(A) and (B) show a stopper 70 for keeping the presser disc 32 in a contracted and receded position, i.e. at a position closest to the rotating disc 31 while the churning wings 33 revolve. FIG. 10(A) is a cross-sectional side view of the stopper 70 and FIG. 10(B) is a view as seen along the line B—B of FIG. 10(A). The stopper 70 can be attached to and detached from the rotating axle 61 at the side surface thereof. While churning, the stopper 70 is fixed to the rotating axle 61 to prevent the presser disc 32 from moving downward, as shown in FIG. 2. To press out the soft ice cream, the stopper 70 is detached therefrom, and both the rotating axle 61 and the handle axle 60 can be inserted into the housing 10.

We claim:

1. A soft ice cream maker comprising a housing having a longitudinal axis, said housing having a central portion defining a churning chamber and an outer circumferential portion, a coolant storage chamber filled with coolant disposed in said outer circumferential portion, a stand for holding said housing in an inclined disposition, said housing having a top opening, a churning and pressing-out means removably inserted into said churning chamber from said top opening of said housing, and a discharge exit means at the bottom of said housing capable of being opened and closed for discharging soft ice cream, said churning and pressing-out means comprising a plurality of churning wings which are elongated parallel to said longitudinal axis, said churning wings having end tip portions, a presser disc having slits for receiving said churning wings, a rotating disc to which said tip portions are fixed, said rotating disc having an opening, and a rotatable axle received in said opening and operable to rotate said rotating disc, said presser disc, and said churning wings.

2. A soft ice cream maker according to claim 1, wherein said coolant storage chamber is separately formed from said housing such that said coolant storage chamber is insertable and removable from said housing.

3. A soft ice cream maker according to claim 1, wherein said churning wings are slidably received in said slits in said presser disc.

4. A soft ice cream maker comprising a housing having a longitudinal axis, said housing having a central portion defining a churning chamber and an outer circumferential portion, a coolant storage chamber filled with coolant disposed in said outer circumferential portion, said housing having a top opening, a churning and pressing-out means removably inserted into said churning chamber from said top opening of said housing, and a discharge exit means at the bottom of said housing capable of being opened and closed for discharging soft ice cream, said churning and pressing-out means comprising a plurality of churning wings which are elongated parallel to said longitudinal axis, a presser disc having slits for receiving said churning wings, a rotating disc to which said churning wings are fixed, and a rotatable axle means for rotating said rotating disc, said presser disc, and said churning wings.

5. A soft ice cream maker according to claim 4, wherein said rotating disc has an opening for slidable receiving said axle means.

6. A soft ice cream maker according to claim 4 further comprising fixing means fixing said axle means to said presser disc.

7. A soft ice cream maker according to claim 4, wherein said coolant storage chamber has a cup-like configuration with a cylindrical side wall and a bottom wall, said bottom wall having a central opening through which discharging soft ice cream passes.

8. A soft ice cream maker according to claim 4, wherein said housing has a cover, said cover having an opening through which an outer portion of said axle means passes, said outer portion of said axle means having a manually operable handle for rotating said axle means.

* * * * *